L. F. DOUGLASS.
METHOD AND APPARATUS FOR PRODUCING MULTIPLE IMAGE EFFECTS IN PHOTOGRAPHY.
APPLICATION FILED OCT. 31, 1921.
1,424,886.
Patented Aug. 8, 1922.
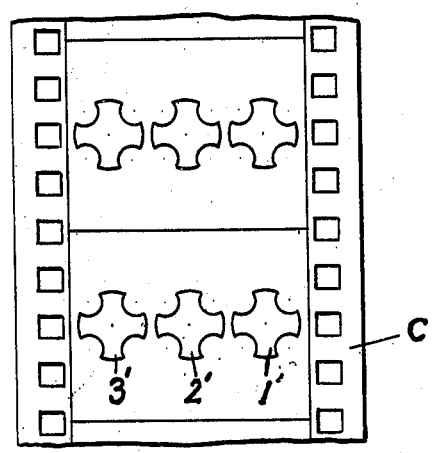
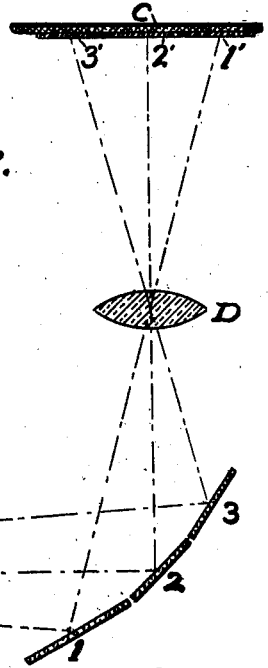
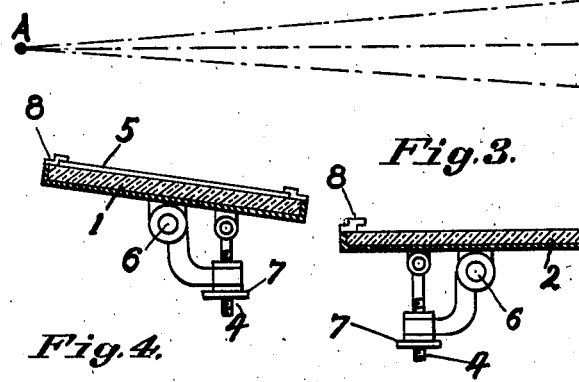
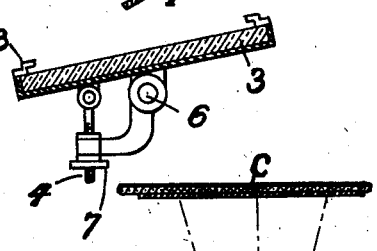
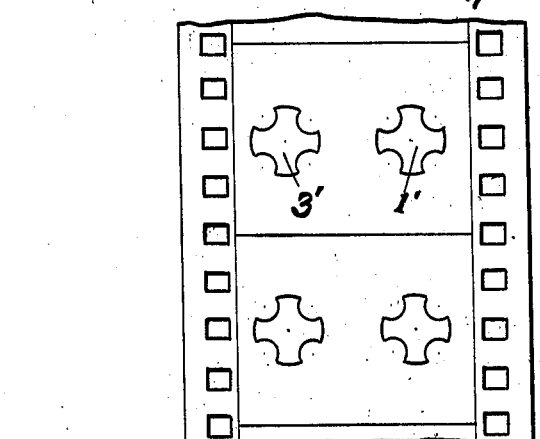
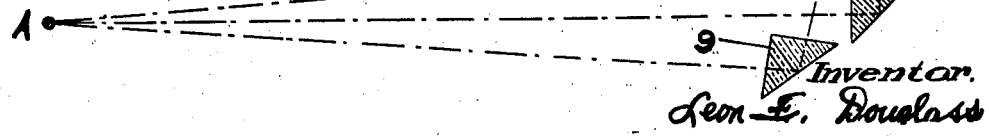
Inventor.
Leon F. Douglass

UNITED STATES PATENT OFFICE.

LEON F. DOUGLASS, OF MENLO PARK, CALIFORNIA.

METHOD AND APPARATUS FOR PRODUCING MULTIPLE-IMAGE EFFECTS IN PHOTOGRAPHY.

1,424,886.  Specification of Letters Patent.  Patented Aug. 8, 1922.

Application filed October 31, 1921. Serial No. 511,882.

*To all whom it may concern:*

Be it known that I, LEON F. DOUGLASS, a citizen of the United States, and a resident of Menlo Park, California, have invented new and useful Improvements in Methods and Apparatus for Producing Multiple-Image Effects in Photography, which invention is fully set forth in the following specification.

This invention relates to a method and apparatus for producing variable effects on a photographic film or plate and, more particularly, to a method and apparatus whereby at will one or more images of a single object may be produced on a single sensitized film or plate.

An object of this invention is to provide a novel method and improved apparatus whereby a plurality of laterally displaced images may be produced simultaneously upon a single photographic film or plate.

Another object of this invention is to provide apparatus of the type just characterized which may be readily applied to an ordinary camera without change in its mechanism or construction.

Another object of this invention is to provide a novel method and improved apparatus whereby novel effects may be secured upon a single film or plate by masking entirely or to variable extents one or more of a plurality of light-reflecting elements positioned to reflect one or more images through a lens upon a sensitized film or plate.

Another object of the present invention is to provide apparatus of the type just characterized with means for variably adjusting or variably masking or both one or more of a plurality of light-reflecting elements.

Stated broadly, the invention comprises in combination with a sensitized film or plate and a lens for focusing images onto said film, a plurality of light-reflecting elements positioned to reflect one or more images through said lens onto said film.

Generally stated, I so position a plurality of light-reflecting prisms or mirrors with reference to a lens, which may be the lens of an ordinary camera, that they are in the path of the light rays from an object to be photographed, positioned at approximately right angles with reference to the axis of said lens, and reflect a plurality of images through said lens onto a sensitized film or plate, whereby novel and multiple image effects may be produced upon a single film or plate by a single exposure. The number of images formed will be the same as the number of the light-reflecting prisms or mirrors subjected to the light rays and the position of said images on the film or plate with respect to its width may be varied by adjusting the angularity of the prisms or mirrors.

In order to increase the number of novel and multiple image effects that may be secured, I preferably associate one or more shutters or other suitable means with said light-reflecting elements so as to variably mask the same, whereby the light rays coming from the object to be photographed may be entirely or partly cut off from any one or more of said light-reflecting elements. The number and extent of the images produced upon the film or plate will therefore vary in accordance with the manipulation of the shutters.

Any suitable number of mirrors or prisms may therefore be employed so as to form at will one or more images on the film or plate by manipulation of said shutters, and said images will be of the same size and shape as, and bear relative proportions to, the object photographed, while they may be laterally displaced by adjustment of the mirrors or prisms so as to occupy desired positions in the width of the film in conformity with the number of images formed.

The invention is capable of being carried out in a variety of ways and of receiving a variety of mechanical expressions, two of which are illustrated on the accompanying drawings, but it is to be expressly understood that the drawings are for purposes of illustration only and are not to be construed as a definition of the limits of the invention, reference being had to the appended claims for that purpose.

In said drawings:—

Fig. 1 is a diagrammatic fragment of a photographic film upon which three images of a single object are produced side by side;

Fig. 2 is a diagrammatic view illustrating the relative arrangement of the object to be photographed, the light reflecting elements, the lens and the photographic film;

Fig. 3 is a schematic view illustrating somewhat more in detail a plurality of mirrors which may be used for producing multiple image effects, together with means for variably adjusting and masking the same;

Fig. 4 is a diagrammatic fragment of a photographic film upon which two images of a single object are produced side by side; and Fig. 5 is a view corresponding to Fig. 2 to illustrate the use of prisms in place of mirrors.

Referring more particularly to Figs. 1, 2 and 3, an object A, which is to be photographed, is positioned at an angle of approximately 90° with reference to the axis of the lens D, which may be the lens of any suitable camera. Interposed in the path of the rays of light emanating from the object A are a plurality of light reflecting elements which, in the form shown in Figs. 2 and 3, are three light reflecting mirrors 1, 2 and 3 so positioned that they will reflect the light rays through the lens D and onto a sensitized film or plate C within the camera box.

In order to produce clear and distinct images the mirrors 1, 2 and 3 must be positioned at the proper reflecting angle so that the several images 1', 2' and 3' are all included upon the sensitized film C and, also, so positioned as not to overlap. To enable said mirrors to be positioned at the proper reflecting angle, they may be mounted for adjustment in any suitable way. In the form shown in Fig. 3 the respective mirrors are hingedly mounted at 6 and may be separately adjusted about the hinged mountings by manipulation of adjusting nuts 7 which respectively coact with adjusting screws 4 pivotally attached to the respective mirrors.

I have found that if three mirrors are to be employed, as in the form shown in Figs. 2 and 3, the respective images 1', 2' and 3' formed on the film C will be satisfactorily positioned if the mirrors 1 and 3, which are on either side of the middle mirror 2, make an angle of about 10° with said mirror 2. In order to position the mirrors at the proper distance from the lens, any suitable means for controlling or adjusting said mirrors is attached to the same and operated to move said mirrors either away from or toward the lens, as is desired.

To provide for varying the number of images formed and to secure novel effects with the mirrors subjected to the light rays passing thereto from the object to be photographed, I preferably provide each of the mirrors with any suitable means for masking the same entirely or to different variable extents. In the form shown in Fig. 3, I provide each of the mirrors 1, 2 and 3 with a suitable shutter 5 which may be reciprocated in suitable ways 8 so as to entirely or partly cover the face of the respective mirror. In Fig. 3 the shutter 5 is shown as covering the face of the mirror 1 while the shutters associated with the mirrors 2 and 3 are withdrawn so as to subject said latter mirrors to the light rays passing from the object to be photographed.

The number of images formed on the sensitized film C will vary with the number of mirrors subjected to the light rays passing from the object to be photographed. Therefore, by masking one or more of the mirrors, a lesser number of images may be formed than the number of mirrors with which the device is supplied. For example, the middle mirror 2 in Fig. 3 may be masked and the mirrors 1 and 3 will then form two images 1' and 3', as illustrated in Fig. 4, and by suitably adjusting the angularity of the mirrors 1 and 3 said images 1' and 3' can be symmetrically positioned with respect to the width of the film, as shown in said figure. Thus by suitably adjusting the angularity of such mirrors as are subjected to the light rays passing from the object to be photographed, the position of the images reflected thereby through the lens D may be positioned at the desired portions of the film with respect to its width.

In carrying out the present invention, it is not necessary that mirrors be employed as the light-reflecting elements. In the form shown in Fig. 5, three light-reflecting prisms 9, 10 and 11 have been substituted for the mirrors 1, 2 and 3 of Fig. 2. It is to be understood that the prisms 9, 10 and 11 may be provided with means for either or both variably adjusting and masking the same, as in the case of the mirrors of the embodiment of Figs. 2 and 3. The term "light-reflecting element" as used herein is therefore to be construed as generic to light-reflecting prisms as well as mirrors.

While three mirrors or three prisms have been illustrated in each of the two embodiments shown on the drawing, it is to be understood that I am not limited to this parti-number of light reflecting elements, as a lesser or a greater number of the same may be used in conformity with the maximum number of images which it may be desired to obtain, the lesser number of images being secured when desired by masking one or more of the light reflecting elements provided.

It will therefore be perceived that I have provided a method and apparatus whereby novel and multiple image effects may be produced upon a single film by a single exposure. The plurality of light-reflecting elements will simultaneously reflect a plurality of images through the lens D onto the film or plate C and the relative position of the laterally displaced images may be adjusted by separately adjusting the angularity of the respective light-reflecting elements with respect to the axis of the lens. A lesser number of images may be secured by entirely masking one or more of said light-reflecting elements, while the extent of one or more of the images may be varied by masking to variable extents one or more of the mirrors subjected to the rays passing from the object to be photographed. Therefore, by variously adjusting the respective shutters and the angles of the respective light reflecting elements, a relatively large number of effects may be produced and the number of images formed may be varied from one to the number of light-reflecting elements employed while, at the same time, the position of said image or images may be suitably adjusted with respect to the width of the film.

By suitably adjusting one or more of the light-reflecting elements together with the masking means, a portion of the film may be left unexposed and, therefore, the unexposed portion may be thereafter subjected to one or more images of the same or a different object by suitable further adjustment of the light reflecting elements and the masking means. Therefore, the present invention is not restricted to the simultaneous exposure of the film to all of the images which are to appear laterally displaced with respect to its width, as the present invention provides for the successive as well as the simultaneous production of multiple image effects.

While the embodiments of the invention illustrated on the drawings have been described with considerable particularity, it is to be expressly understood that the invention is not restricted thereto as the same may be carried out in a variety of ways and embodied in a variety of forms, some of which will now readily suggest themselves to those skilled in the art. Changes may be made in the means for adjusting the light-reflecting elements and in the means for masking said elements as well as the means for adjusting said masking means without departing from the spirit of this invention. Nor am I limited to any particular kind or form of photography, as it is apparent that my invention may be used in connection with both still and motion photography or cinematography. Nor am I limited to the use of any particular character of sensitized element upon which the negative is to be formed and the term "film" as employed in the claims is to be construed as generic to plates or other suitably sensitized elements. Reference is therefore to be had to the claims hereto appended for a definition of the limits of the invention.

What is claimed is:—

1. The method of producing variable multi-image effects on a single sensitized film, which comprises interposing in the path of light rays from an object to be photographed, a plurality of elements capable of directing a plurality of images onto said film and successively exposing the film to a series of laterally disposed images.

2. Means for producing a plurality of laterally displaced images of an object upon a sensitized film comprising, in combination with a lens, a plurality of light-directing elements positioned to direct a plurality of images through said lens onto said film and means for varying the exposed portion of said film.

3. Means for producing a plurality of laterally displaced images of an object upon a sensitized film comprising, in combination with a lens, a plurality of light-reflecting elements positioned to reflect a plurality of images through said lens onto said film, means for adjusting one or more of said light-reflecting elements and means for leaving a portion of the film unexposed.

4. Means for producing a plurality of laterally displaced images of an object upon a sensitized film comprising, in combination with a lens, a plurality of light-reflecting elements positioned to reflect a plurality of images through said lens onto said film, and means for masking one or more of said light-reflecting elements.

5. Means for producing a plurality of laterally-displaced images of an object upon a sensitized film comprising, in combination with a lens, a plurality of light-directing elements positioned to direct a plurality of images through said lens onto said film, means for adjusting the angle of each of said light-directing elements with respect to the axis of said lens and means for exposing any desired portion of said film.

6. Means for producing a plurality of laterally displaced images of an object upon a sensitized film comprising, in combination with a lens, a plurality of light-reflecting elements positioned to reflect a plurality of images through said lens onto said film, and a reciprocating shutter for each of said light-reflecting elements.

7. Means for producing a plurality of laterally displaced images of an object upon a sensitized film comprising, in combination with a lens, a plurality of light-reflecting elements positioned to reflect a plurality of images through said lens onto said film, means for adjusting one or more of said light-reflecting elements, and means for masking one or more of said light-reflecting elements in any of their positions of adjustment.

8. Means for producing a plurality of laterally displaced images of an object upon a sensitized film comprising, in combination with a lens, a plurality of light-reflecting elements positioned to reflect a plurality of images through said lens onto said film, and means to mask each of said light-reflecting elements to variable extents.

9. Means for the successive as well as simultaneous production of a plurality of laterally displaced images of an object upon a sensitized film comprising, in combination with a lens, a plurality of light-reflecting elements positioned to reflect a plurality of images through said lens onto said film, and means to adjust each of said light reflecting elements to vary its reflected image with respect to the width of said film.

10. In combination with a lens, a plurality of light-directing elements positioned to direct images through said lens onto a film and means for leaving a portion of the film unexposed.

11. In combination with a lens, a plurality of light-reflecting elements positioned to reflect images through said lens onto a sensitized film, and means to mask one or more of said light-reflecting elements.

12. In combination with a lens, a plurality of light-reflecting elements positioned to reflect images through said lens onto a sensitized film, means to adjust the angularity of one or more of said light-reflecting elements and means for varying the exposed portion of said film.

13. In combination with a lens, a plurality of light-reflecting elements positioned to reflect images through said lens onto a sensitized film, means to vary the number of said images and means for leaving a portion of the film unexposed.

14. In combination with a lens, a plurality of light-reflecting elements positioned to reflect images through said lens onto a sensitized film, means to vary the location of said images with respect to the width of said film and means for exposing any desired portion of said film.

15. In combination with a lens, a plurality of light reflecting elements positioned to reflect images through said lens onto a sensitized film, and separate means for masking each of said light-reflecting elements to variable extents.

16. In combination with a lens, a plurality of light-reflecting elements positioned to reflect images through said lens onto a sensitized film, separate means for adjusting each of said light-reflecting elements and means for leaving a portion of the film unexposed.

17. The method of producing variable multi-image effects on a single sensitized film which comprises interposing a plurality of light-reflecting elements in the path of light rays from an object to be photographed, reflecting one or more images of said object through a lens onto the sensitized film and successively exposing the film to a series of laterally displaced images.

18. The method of producing variable multi-image effects on a single sensitized film which comprises interposing a plurality of light-reflecting elements in the path of light rays from an object to be photographed, masking one or more of said light-reflecting elements to vary the number or extent of the images, and reflecting the images through a lens onto the sensitized film.

LEON F. DOUGLASS.